United States Patent
Ito

(10) Patent No.: US 9,148,529 B2
(45) Date of Patent: Sep. 29, 2015

(54) INFORMATION PROCESSING APPARATUS, WEB SERVER, CONTROL METHOD AND STORAGE MEDIUM

(75) Inventor: Fumitoshi Ito, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 8 days.

(21) Appl. No.: 12/995,865

(22) PCT Filed: Oct. 20, 2010

(86) PCT No.: PCT/JP2010/069013
§ 371 (c)(1),
(2), (4) Date: Dec. 2, 2010

(87) PCT Pub. No.: WO2011/070867
PCT Pub. Date: Jun. 16, 2011

(65) Prior Publication Data
US 2011/0208809 A1    Aug. 25, 2011

(30) Foreign Application Priority Data
Dec. 10, 2009    (JP) .................................. 2009-280955

(51) Int. Cl.
*G06F 15/16*    (2006.01)
*H04N 1/00*    (2006.01)

(52) U.S. Cl.
CPC ........ *H04N 1/00222* (2013.01); *H04N 1/00244* (2013.01); *H04N 1/00408* (2013.01); *H04N 2201/3207* (2013.01); *H04N 2201/3274* (2013.01); *H04N 2201/3278* (2013.01)

(58) Field of Classification Search
CPC .......... H04N 1/00222; H04N 1/00244; H04N 1/00408; H04N 2201/3207; H04N 2201/3274; H04N 2201/3278
USPC ........................................................ 709/203
See application file for complete search history.

(56) References Cited

U.S. PATENT DOCUMENTS 7,502,835 B1 *    3/2009    Cheng .......................... 709/217
7,685,521 B1      3/2010    Ueda et al.
(Continued)

FOREIGN PATENT DOCUMENTS

CN    1749997 A      3/2006
CN    101094281 A    12/2007
(Continued)

OTHER PUBLICATIONS

Mar. 25, 2014 Official Action in Chinese Patent Appln. No. 201080055066.0.
(Continued)

*Primary Examiner* — Christopher Biagini
(74) *Attorney, Agent, or Firm* — Fitzpatrick, Cella, Harper & Scinto

(57) ABSTRACT

An information processing apparatus according to the present invention includes a first transmission means that transmits to a Web server first request data describing contents of a user's instruction via an operation screen displayed with a Web browser, an execution means that receives from the Web server response data to the first request data from the first transmission means and executes image processing based on the received response data, and a second transmission means that transmits second request data to the Web server based on the response data received from the Web server. The response data received from the Web server includes plural addresses to be accessed according to events that can occur when the execution means executes the image processing. The second transmission means transmits the second request data to one of the addresses corresponding to an event having occurred when the execution means has executed the image processing.

19 Claims, 11 Drawing Sheets

(56) References Cited

U.S. PATENT DOCUMENTS

| | | |
|---|---|---|
| 7,765,248 B2 | 7/2010 | Kanasaki |
| 2002/0092007 A1* | 7/2002 | Harrington et al. ............ 717/168 |
| 2003/0005118 A1* | 1/2003 | Williams ....................... 709/225 |
| 2004/0113908 A1* | 6/2004 | Galanes et al. ............... 345/418 |
| 2004/0239713 A1* | 12/2004 | Kang .............................. 347/19 |
| 2004/0243923 A1 | 12/2004 | Nakamura |
| 2005/0134893 A1* | 6/2005 | Han ............................ 358/1.14 |
| 2006/0059462 A1 | 3/2006 | Yamamoto |
| 2006/0077423 A1 | 4/2006 | Mathieson et al. |
| 2009/0303532 A1 | 12/2009 | Ito |
| 2010/0268770 A1 | 10/2010 | Kanasaki |

FOREIGN PATENT DOCUMENTS

| | | |
|---|---|---|
| JP | 10-307795 A | 11/1998 |
| JP | 2002-230190 A | 8/2002 |
| JP | 2004-140703 A | 5/2004 |
| JP | 2004-303218 A | 10/2004 |
| JP | 2005242994 A | 9/2005 |
| JP | 2006085356 A | 3/2006 |
| JP | 2006-127503 A | 5/2006 |
| JP | 2006-135644 A | 5/2006 |
| JP | 2006172178 A | 6/2006 |
| JP | 2007-072959 A | 3/2007 |
| JP | 2007088665 A | 4/2007 |
| JP | 2008-003833 A | 1/2008 |
| JP | 2008-090653 A | 4/2008 |
| JP | 2009-086805 A | 4/2009 |
| KR | 10-2001-0084461 A | 9/2001 |
| WO | 2006/092840 A1 | 9/2006 |

OTHER PUBLICATIONS

May 11, 2015 Japanese Appeal Decision in Japanese Patent Appln. No. 2009-280955.

Osamu Koizumi, "Understand by graphical explanation Everything about Web technology," Nippon Jitsugyo Publishing, 4th Edition (Apr. 20, 2001), pp. 52, 57, and 144-147.

Keisuke Taguchi, "16th time Page transition in ASP.NET (1/4) Serialization Programming ASP.NET—Web Application Hands-on Development Course by ASP.NET," (Apr. 5, 2003; searched on Mar. 17, 2015), Internet <URL:http://www.atmarkit.co.jp/ait/article/0304/05/news003.html>.

Takafumi Noso, "Why is session management necessary?," (Feb. 2, 2001; searched on Mar. 29, 2015), Internet <URL:http://www.atmarkit.co.jp/fjava/javafaq/session/session01.html>.

Aug. 7, 2015 Chinese Official Action in Chinese Patent Appln. No. 201080055066.0.

* cited by examiner

FIG. 7

```xml
<?xml version ="1.0" encoding ="UTF-8"?>
<JobScript xmlns ="http://www.xxx.co.jp/jobScript">
  <TimeOut>20 Minutes</TimeOut>
  <EventHandler>                    ~ 901
    <Event Type ="AllError"/>
    <Notify>
      <URL>http://www.xxx.com/scriptError.htm</URL>
      <NotifyItem key ="id" value="0123"/>
      <NotifyScriptInfo key ="jobType" value ="SorceJobType"/>
      <NotifyScriptInfo key ="errorEvent" value ="EventName"/>
    </Notify>
  </EventHandler>
  <EventHandler>                    ~ 902
    <Event Type ="SendStart"/>
    <Notify>
      <URL>http://www.xxx.com/scriptSendStart.htm</URL>
      <NotifyItem key ="id" value ="0123"/>
    </Notify>
  </EventHandler>
  <EventHandler>                    ~ 903
    <Event Type ="TimeOut"/>
    <Notify>
      <URL>http://www.xxx.com/scriptTimeOut.htm</URL>
      <NotifyItem key ="id" value="0123"/>
    </Notify>
  </EventHandler>
  <Scan>                            ~ 904
    <Settings>
      <DocumentSize>AUTO</DocumentSize>
      <ColorMode>GRAY_SCALE</ColorMode>
    </Settings>
  </Scan>
  <Send>                            ~ 905
    <Settings>
      <FTPAddress>
        <HostName>ftpserver.xxx.com</HostName>
        <Path>ScanDocument</Path>
        <UserName>user</UserName>
        <Password>pass</Password>
      </FTPAddress>
      <FileFormat>PDF</FileFormat>
      <FileName>test</FileName>
    </Settings>
  </Send>
</JobScript>
```

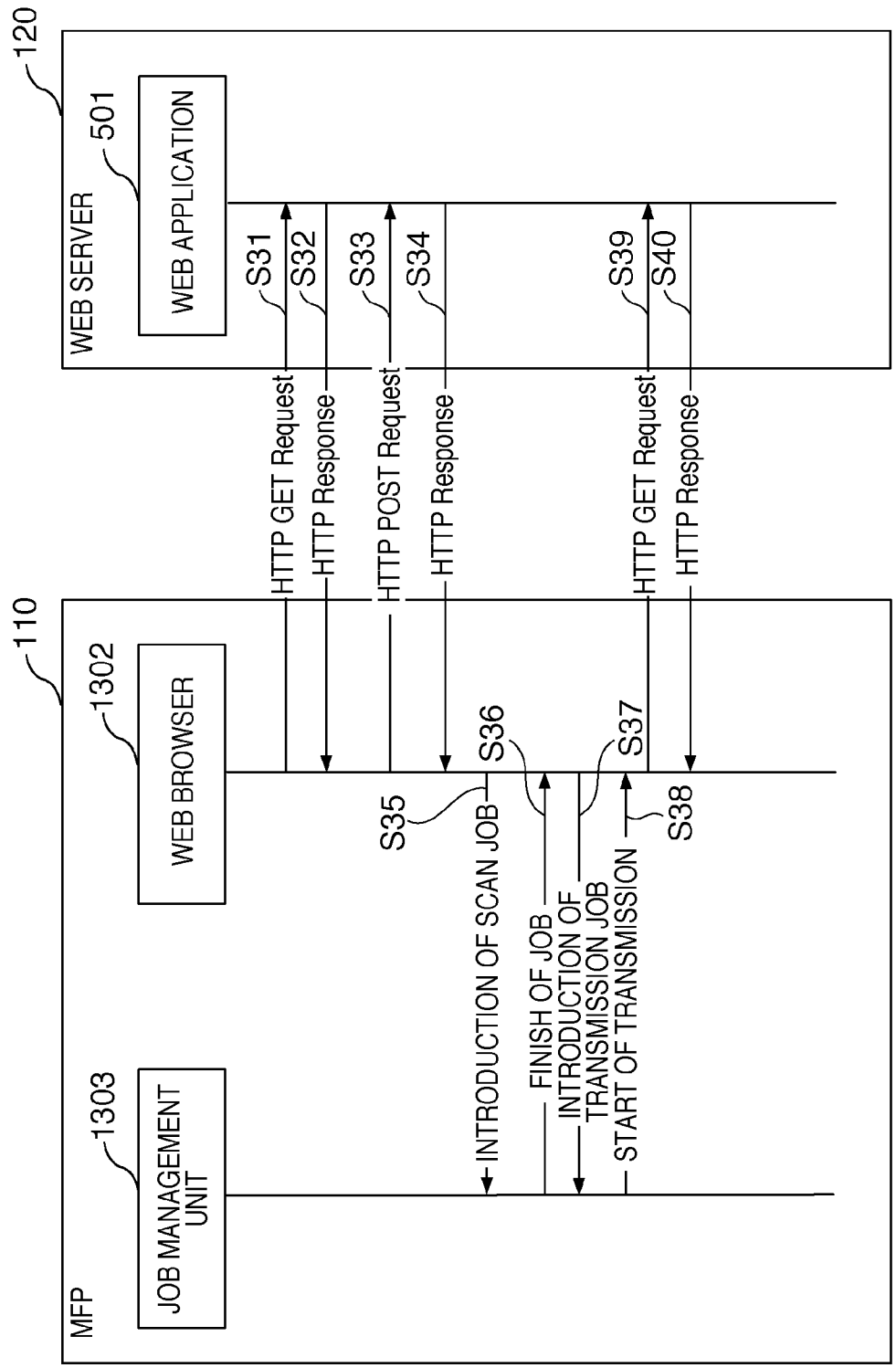

FIG. 13

```
<!DOCTYPE...>
<html xmlns="http://www.w3.org/1999/xhtml">
<head>
  <title> InExecution </title>
</head>
<body>
  <div>
    <p class="message">
       Processing In Execution </p>
  </div>
  <script type ="text/JavaScript">
  <!--
  var scanParams = new Array ();
  scanParams[0] = CreateParam("colorMode","FullColor");       ⎫
  scanParams[1] = CreateParam("resolution","300dpi");          ⎬ 1501
  scanParams[2] = CreateParam("timeOut","20minutes");         ⎭
  var eventHandler = new Array ();                                                          ⎫ 1502
  eventHandler [0] = CreateEventHandler ("TimeOut","NotifyURL", "jobCancel ",        ⎪
     "scriptTimeOut .htm?id=01234");                                                          ⎬
  eventHandler [1] = CreateEventHandler ("AllError","NotifyURL", "jobCancel ",         ⎪
     "scriptError. htm?id=01234&jobType =%JOB_TYPE%& errorEventt =%EVENT_NAME%"); ⎭
  var scanDocument = new Document ();
  var scanResult= scan (scanDocument, scanParams, eventHandler);   ⎬ 1503 if ("SUCCESS" == scanResult)
  {
    var sendParams=new Array();                                      ⎫
    sendParams[0] = CreateParam("protocol","FTP");                   ⎪
    sendParams[1] = CreateParam("hostName","ftpserver.xxx.com");     ⎪
    sendParams[2] = CreateParam("filePath","ScanDocument");          ⎬ 1504
    sendParams[3] = CreateParam("user","user");                       ⎪
    sendParams[4] = CreateParam("password","pass");                  ⎪
    sendParams[5] = CreateParam("fileFormat","PDF");                 ⎪
    sendParams[6] = CreateParam("fileName","test");                  ⎭
    var eventHandler = new Array ();                                                          ⎫
    eventHandler [0] = CreateEventHandler ("AllError","NotifyURL", "jobCancel ",        ⎪
      "scriptError.htm?id=01234&jobType=%JOB_TYPE%& result=%EVENT_NAME%");  ⎬ 1505
    eventHandler [1] =CreateEventHandler ("SendStart", "NotifyURL", "jobBackGround",   ⎪
      "scriptSendStart .htm?id=01234");                                                       ⎭
    send(scanDocument, scanParams, eventHandler);    ～1506
  }
  //-->
  </script>
</body>
</html>
```

INFORMATION PROCESSING APPARATUS, WEB SERVER, CONTROL METHOD AND STORAGE MEDIUM

TECHNICAL FIELD

The present invention relates to an information processing apparatus provided with a Web browser for displaying operation screens provided from a Web server, a method for controlling the apparatus, the Web server that provides operation screens to the information processing apparatus provided with the Web browser, a method for controlling the server, and a storage medium.

BACKGROUND ART

Some information processing apparatuses (for example, PCs) connected to a Web server on a network are provided with a Web browser that displays operation screens provided from the Web server. When the Web browser issues a request to the Web server for an operation screen, a Web application provided to the Web server makes a response to the information processing apparatus, that is, it transmits hyper text markup language (HTML) file data for displaying the operation screen with the Web browser in accordance with the request from the apparatus. Upon receiving the response from the Web server, the Web browser analyzes the HTML file data, and generates the operation screen based on the description in the HTML file. Moreover, after the user inputs instruction data via the operation screen displayed with the Web browser, the Web browser notifies the provided instruction to the Web server. Then the Web application in the Web server having received the notification executes processing according to the provided instruction.

In recent years, some multi function peripherals (MFPs) each having a scanner and a printer are provided with the above Web browser. Such MFPs receive operation screen data from a Web server, display the operation screen with the Web browser in themselves by using the foregoing procedure, and then accept various instructions from a user.

According to Japanese Patent Laid-Open No. 2006-127503 (Literature 1), a Web server provides operation screens on which instruction data is inputted to use various functions provided to a MFP. That is, the user of the MFP inputs data describing an instruction to the MFP via an operation screen displayed with the Web browser. Then the received instruction is notified to the Web server according to the Web browser in the MFP. The Web server having received the notification requests the MFP to execute various kinds of processing according to contents of the instruction data inputted by the user. Thereafter, the MFP having received the request executes the requested processing. Thus there is no need for the MFP to hold all operation screens (menu data and so on) to be displayed on the display panel of the MFP, and the operation screens can be changed easily with the Web server.

Furthermore, according to Japanese Patent Laid-Open No. 2006-135644 (Literature 2), as in the case of Literature 1, a Web server provides operation screens on which instruction data is input to use various functions provided to a MFP. Likewise, the user of the MFP inputs data describing an instruction to the MFP. Then the provided instruction is notified to the Web server as a request by using the Web browser in the MFP. The Web server having received the notification creates a script in which various kinds of processing to be executed by the MFP are described based on the provided instruction. The created script is sent from the Web server to the MFP as a response to the request from the Web server.

In general, where a Web application provided to a Web server executes processing based on instruction data input via an operation screen displayed with a Web browser, another screen is displayed with the Web browser in accordance with the completion of the processing at the Web application. That is, upon completing processing at the Web application, the Web server generates HTML data describing an operation screen for notifying the processing completion or an operation screen for making the user perform the next operation. Then the generated HTML data is transmitted to the Web browser as a response to the request from the Web browser.

On the other hand, in some Web browsers provided to information processing apparatus such as PCs and MFPs, a time limit (timeout period) is set from the sending of a request to a Web server to the reception of a response from the Web server. When no response is made from the Web server within the timeout period, the Web browser executes timeout processing. Timeout processing refers to processing for invalidating an issued request. By invalidating the issued request, another request can be issued instead of waiting a response to the request, for example.

In Literature 1, however, in the case where the Web browser in the MFP sends a request to the Web server and then the Web server requests the MFP to execute processing based on the request, the following problems can be considered. That is, in Literature 1, the result of the processing executed by the MFP is notified to the Web server temporarily. Then the Web server having received the notification transmits HTML data describing the processing result to the Web browser as a response to the request having been sent initially from the Web browser. At that time, there is a possibility that it takes time for the MFP to execute the processing in accordance with the request from the Web server. In that case, a long period of time is required from the reception of the request from the Web browser at the Web server to the reception of the response at the Web browser, and thus the foregoing timeout processing is executed at the Web browser. As a result, it becomes impossible for the Web browser to receive the response from the Web server normally, and therefore the result of the processing executed by the MFP cannot be notified to the user.

On the other hand, in Literature 2, the Web browser in the MFP receives a request for processing execution from the Web server as a response to the request from the Web browser. In that case, no timeout occurs at the Web browser. In Literature 2, however, after the Web server has passed script data to the MFP as a response, another display cannot be produced with the Web browser on the instruction of the Web server. Because of this, during the execution of the script and after the execution, it is difficult to dynamically change display of processing at the MFP from the Web application.

SUMMARY OF INVENTION

The present invention has been accomplished in view of the foregoing problems. Thus, the present invention provides an information processing apparatus capable of automatically selecting a destination at a Web server in accordance with the execution condition of processing requested from the Web server, the Web server, a control method, and a storage medium.

According to one aspect of the present invention, there is provided an information processing apparatus including a Web browser with which an operation screen provided from a Web server is displayed, the apparatus comprises first transmission means for transmitting, to the Web server, first request data describing contents of a user's instruction via the operation screen displayed with the Web browser, execution means for receiving, from the Web server, response data to the first request data transmitted by the first transmission means and then executing image processing based on the received response data, and second transmission means for transmitting second request data to the Web server based on the response data received from the Web server, wherein the response data received from the Web server includes plural addresses to be accessed according to events that can occur when the execution means executes the image processing, and the second transmission means transmits the second request data to one of the addresses corresponding to an event having occurred when the execution means has executed the image processing.

According to another aspect of the present invention, there is provided a Web server providing an operation screen to an information processing apparatus including a Web browser, the server comprises first reception means for receiving, from the information processing apparatus, first request data describing contents of a user's instruction via an operation screen displayed with the Web browser, transmission means for transmitting, to the information processing apparatus, response data to the first request data received by the first reception means, and second reception means for receiving, from the information processing apparatus, second request data generated based on the response data, wherein the response data includes plural addresses to be accessed according to events that can occur when the information processing apparatus executes image processing based on the response data, and the second reception means receives the second request data transmitted to one of the addresses corresponding to an event having occurred when the information processing apparatus has executed the image processing.

According to another aspect of the present invention, there is provided a method for controlling an information processing apparatus including a Web browser with which an operation screen provided from a Web server is displayed, the method comprises a first transmission step of transmitting, to the Web server, first request data describing contents of a user's instruction via the operation screen displayed with the Web browser, an execution step of receiving, from the Web server, response data to the first request data transmitted in the first transmission step and then executing image processing based on the received response data, and a second transmission step of transmitting second request data to the Web server based on the response data received from the Web server, wherein the response data received from the Web server includes plural addresses to be accessed according to events that can occur when the image processing is executed in the execution step, and in the second transmission step, the second request data is transmitted to one of the addresses corresponding to an event having occurred when the image processing has been executed in the execution step.

According to another aspect of the present invention, there is provided a method for controlling a Web server providing an operation screen to an information processing apparatus including a Web browser, the method comprises a first reception step of receiving, from the information processing apparatus, first request data describing contents of a user's instruction via an operation screen displayed with the Web browser, a transmission step of transmitting, to the information processing apparatus, response data to the first request data received in the first reception step, and a second reception step of receiving, from the information processing apparatus, second request data generated based on the response data, wherein the response data includes plural addresses to be accessed according to events that can occur when the information processing apparatus executes image processing based on the response data, and in the second reception step, the second request data transmitted to one of the addresses corresponding to an event having occurred when the information processing apparatus has executed the image processing is received.

According to the invention, it is possible to provide an information processing apparatus capable of automatically selecting a destination at a Web server in accordance with the execution condition of processing requested from the Web server, the Web server, a control method, and a storage medium.

Further features of the present invention will become apparent from the following description of exemplary embodiments with reference to the attached drawings.

BRIEF DESCRIPTION OF DRAWINGS

FIG. 7 is a figure showing an example of a script file.

FIG. 12 is a schematic block diagram showing processing procedure for the information processing system.

FIG. 13 is a figure showing an example of HTML data.

DESCRIPTION OF EMBODIMENTS

Embodiments of the present invention will be described in detail below with reference to the drawings. Note that the following embodiments are not intended as limitations on the appended claims and that all of the combinations of features described in the embodiments are not necessarily essential to means for solving the problems according to the invention.

<First Embodiment>

As an information processing apparatus according to a first embodiment, a MFP having a scanner function, a printer function, etc. is used by way of illustration. The MFP is provided with a Web browser for displaying operation screens provided from a Web server. In this embodiment, at the time of occurrence of an event related to processing execution, a request is issued to the Web server for a user interface (UI) for a screen display corresponding to the event by using the Web browser.

Figure 1:
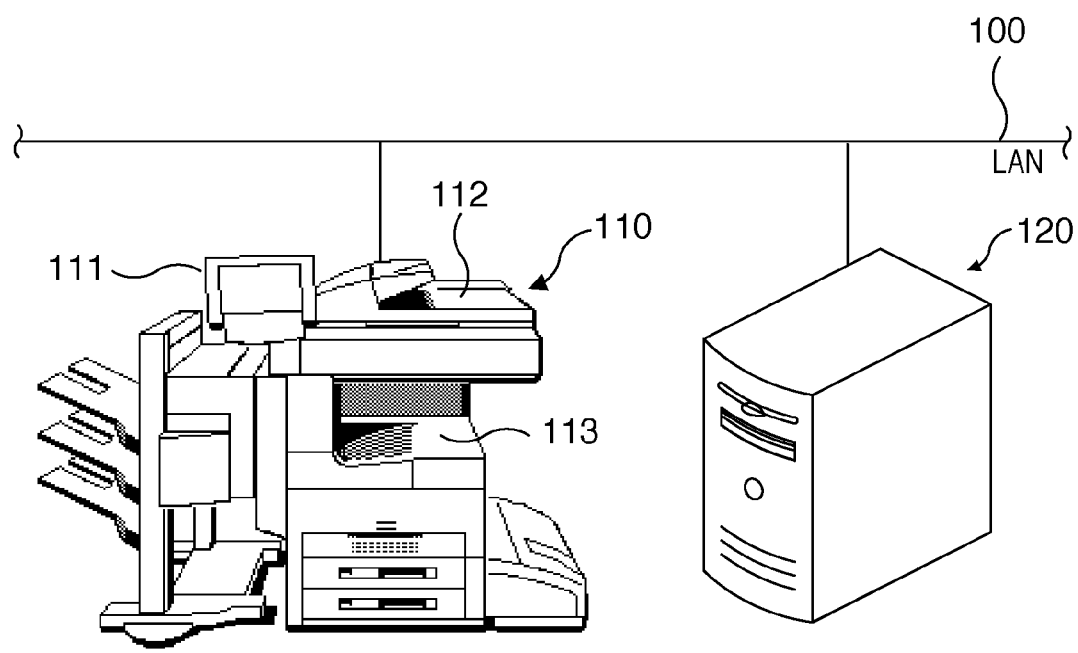
FIG. 1 is an illustration showing the entire configuration of an information processing system according to a first embodiment of the present invention.
Figure 2:
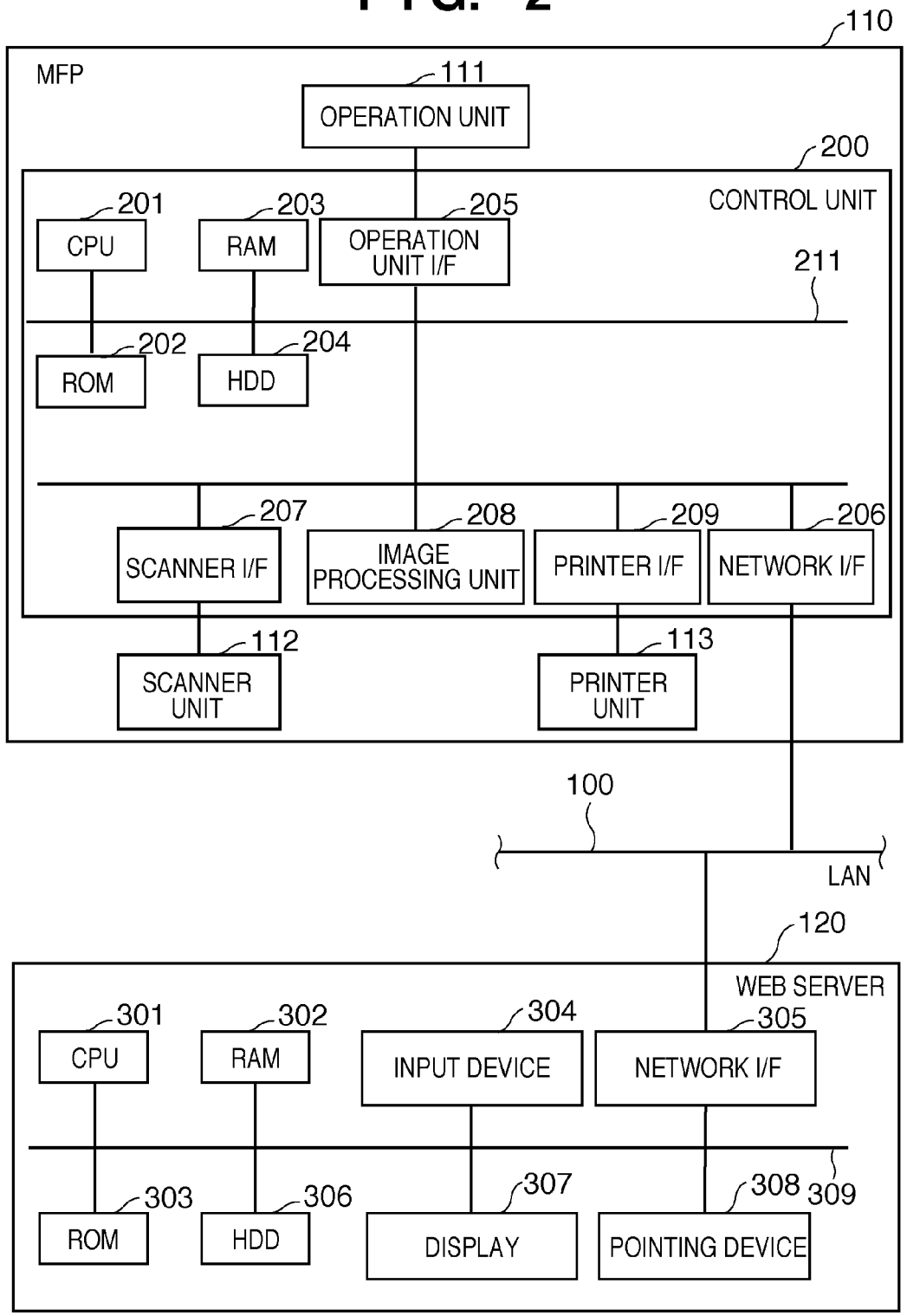
FIG. 2 is block diagram showing the hardware configurations of a MFP and Web server.

[Hardware Configuration of Information Processing System (FIGS. 1 and 2)]

An information processing system according to this embodiment comprises a MFP 110 and a Web server 120 connected to the MFP 110 via a network such as a LAN 100 or the like (Ethernet). The MFP 110 and the Web server 120 are configured so that they can communicate with each other.

The MFP 110 reads original images, and can transmit the image data (which is sometimes referred to as document data) obtained by the reading to a specified apparatus on the LAN 100 by using a FTP, a SMB protocol, or the like (has a data transmission function), or can transmit the image data via a mail server (not shown) in the form of an attachment to an E-mail (has a E-mail sending function). In response to a request from the MFP 110, a Web application provided to the Web server 120 transmits HTML page data to be displayed at the MFP 110 as a response.

Note that the information processing system does not necessarily comprise the MFP 110 and the Web server 120; devices different from those in type may be used such that they are connected to the LAN 100 and can communicate with each other. And further, although the LAN connection is adopted as a method for connecting the MFP 110 and the Web server 120 in this embodiment, the connecting method according to the invention is not limited to the LAN connection; for example, any other network such as a WAN (a public network), serial transmission methods such as the use of USB, parallel transmission methods such as the use of a Centronics interface, the use of SCSI, etc., and so on can also be applied.

(Hardware Configuration of MFP 110)

The MFP 110 comprises a scanner unit 112 for inputting document images, a printer unit 113 for outputting the images, a control section (controller) 200 for controlling the whole MFP 110, and an operation unit 111 where the user performs desired operations.

The scanner unit 112 scans images on documents under exposure to light, and inputs obtained reflected light into a CCD to convert the image data into electrical signals. Then the electrical signals are converted to luminance signals composed of RGB color signal components, following which the luminance signals are output to the control section 200 as digital image data. Incidentally, the documents are loaded in a document feeder. When the user has issued an instruction for the start of their reading at the operation unit 111, a document reading instruction is given from the control section 200 to the scanner unit 112. Upon taking the instruction, the scanner unit 112 reads the documents fed from the document feeder one after the other. Note that as the method for reading documents, a method whereby each document is placed on a glass surface (not shown) and scanned by moving an exposure unit may be used instead of such an automatic feeding scheme using the document feeder.

The printer unit 113 is an image forming MFP that forms images on forms based on the image data from the control section 200. Incidentally, although the electrophotographic method using a photoconductor drum and a photoconductor belt is used as an image forming method in this embodiment, the image forming method according to the invention is not limited to such a system; for example, an inkjet printing system, wherein printing is done using a method of jetting ink from a micronozzle array on forms, can also be applied.

The control section 200 is electrically connected with the operation unit 111, the scanner unit 112, and the printer unit 113, and connected to the LAN 100 via a network I/F 206. Thus, the control section 200 is connected with other apparatus via the LAN 100, by which communications under HTTP can be carried out.

A CPU 201 exercises centralized control of access to various MFPs in connection and access from other MFPs based on a control program and so on stored in a ROM 202; and besides the CPU 201 also exercises centralized control of various kinds of processing carried out at the control section 200. The latter control also includes the execution of programs represented in the form of flowcharts referred to later.

A boot program for the peripheral is loaded into the ROM 202. A RAM 203 serves as a system work memory for the operation of the CPU 201 and a memory for storing image data temporarily. The RAM 203 has a region where even after the power supply of the apparatus proper has been turned off, stored data is held by using a backup or the like and a region where after the power supply has been turned off, stored data is erased.

A hard disk drive (HDD) 204 can be loaded with system software, and can store image data. An operation unit I/F 205 is an interface for connecting a system bus 211 and the operation unit 111. The operation unit I/F 205 receives image data to be displayed at the operation unit 111 from the system bus 211, and transmits the data to the operation unit 111. Also, the operation unit I/F 205 transmits information from the operation unit 111 to the system bus 211. A network I/F 206 is connected to the LAN 100 and the system bus 211 to receive and transmit information.

A scanner I/F 207 corrects, processes, and edits image data from the scanner unit 112. Incidentally, the scanner I/F 207 has the function of determining whether transmitted image data is color image data (in other words, whether the data is monochrome image data), whether the data is character data, whether the data is photographic data, and so on. An image processing unit 208 subjects image data to change-orientation processing, compression processing, decompression processing, and so on. And further, images stored in the HDD 204 can be combined with each other into one image.

A printer I/F 209 receives image data from the image processing unit 208 and subjects the image data to image forming processing while referring to attribute data added to the image data. After the image formation, the image data is output to the printer unit 113.

Note that although the MFP is a network MFP that performs via-UI display in this embodiment, information processing apparatus different from that in type, such as a general-purpose computer connected with a general-purpose scanner, a general-purpose printer, etc., may be used.

(Hardware Configuration of Web Server 120)

The Web server 120 comprises a CPU 301, a RAM 302, a ROM 303, an input device 304, a network I/F 305, a HDD 306, a display 307, and a pointing device 308. All of these components are intercommunicably connected with one another via a system bus 309.

As the input device 304, a keyboard is used by way of illustration. As the display 307, a CRT display is used by way of illustration. As the pointing device 308, a mouse is used by way of illustration.

Control programs, such as an operating system and a Web application, are loaded into the ROM 303 or the HDD 306. The CPU 301 carries out the function of a computer by reading the control program data from the ROM 303 or the HDD 306 on the RAM 302 and executing them as necessary.

The CPU 301 executes processing for displaying various pieces of information at the display 307, and takes instructions from the user and so on from the input device 304 and the pointing device 308. And further, the CPU 301 communicates with other apparatus on the LAN 100 via the network I/F 305.

[Software Configuration of Information Processing System]

(Software Configuration of MFP 110 (FIG. 3))

Software modules for the MFP 110 are loaded into the HDD 204 of the MFP 110, and executed by the CPU 201. A HTTP communication unit 401 is one of the software modules with which the network I/F 206 is operated to carry out communications under HTTP. A Web browser 402 is connected with the Web server 120 via the HTTP communication unit 401. By using the Web browser 402, the CPU 201 issues a request to the Web server 120 for an operation screen represented in HTML, executes the rendering of HTML data describing the operation screen sent from the Web server 120 via the HTTP communication unit 401 to display the data at the operation unit 111, and notifies the Web server 120 of input to the operation screen displayed at the operation unit 111.

By using a script execution unit 403, the CPU 201 analyzes script information from the Web browser 402, splits the information into plural pieces of job information included in the script, and notifies a job management unit 404 to execute the jobs in the order specified in the script.

The job management unit 404 manages the job information and instruct a job execution unit 405 to execute the jobs in the order based on the contents of the instruction from the script execution unit 403. The job execution unit 405, which is one of the foregoing modules, is used to execute processing based on job setting. For example, where the job is a scan job, paper documents are read by operating the scanner unit 112, and image data is stored in the HDD 204. Where the job is a transmission job, the job of transmitting image data stored in the HDD 204 is executed by operating the network I/F 206.

Figure 4:
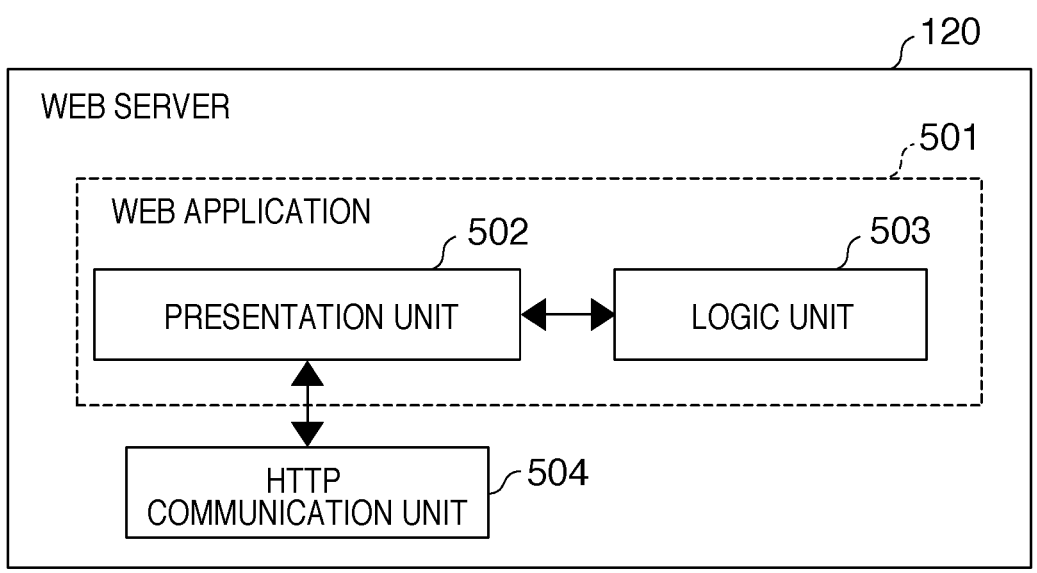
FIG. 4 is a block diagram showing a software configuration in the Web server.

(Software Configuration of Web Server 120 (FIG. 4))

The Web server 120 is provided with a Web application 501 and a HTTP communication unit 504. The Web application 501 comprises a presentation unit 502 and a logic, unit 503. These software modules are loaded into the HDD 306 of the Web server 120, and executed by the CPU 301.

In response to a request from the MFP 110 for an operation screen, the CPU 301 uses the presentation unit 502 to transmit data describing the screen to be displayed with the Web browser 402 in the MFP 110 as a response via the HTTP communication unit 504 to the MFP 110. And further, the presentation unit 502 receives input information from the user input via an operation screen displayed with the Web browser 402 from the MFP 110 via the HTTP communication unit 504.

By using the logic unit 503, the CPU 301 processes input information from the MFP 110 passed from the presentation unit 502. For example, in response to an input from the user, a screen to be displayed is changed, or job definition data for carrying out the device function of the MFP 110 is generated. The HTTP communication unit 504 is a software module with which the network I/F 305 is operated to carry out communications under the HTTP.

Figure 5:
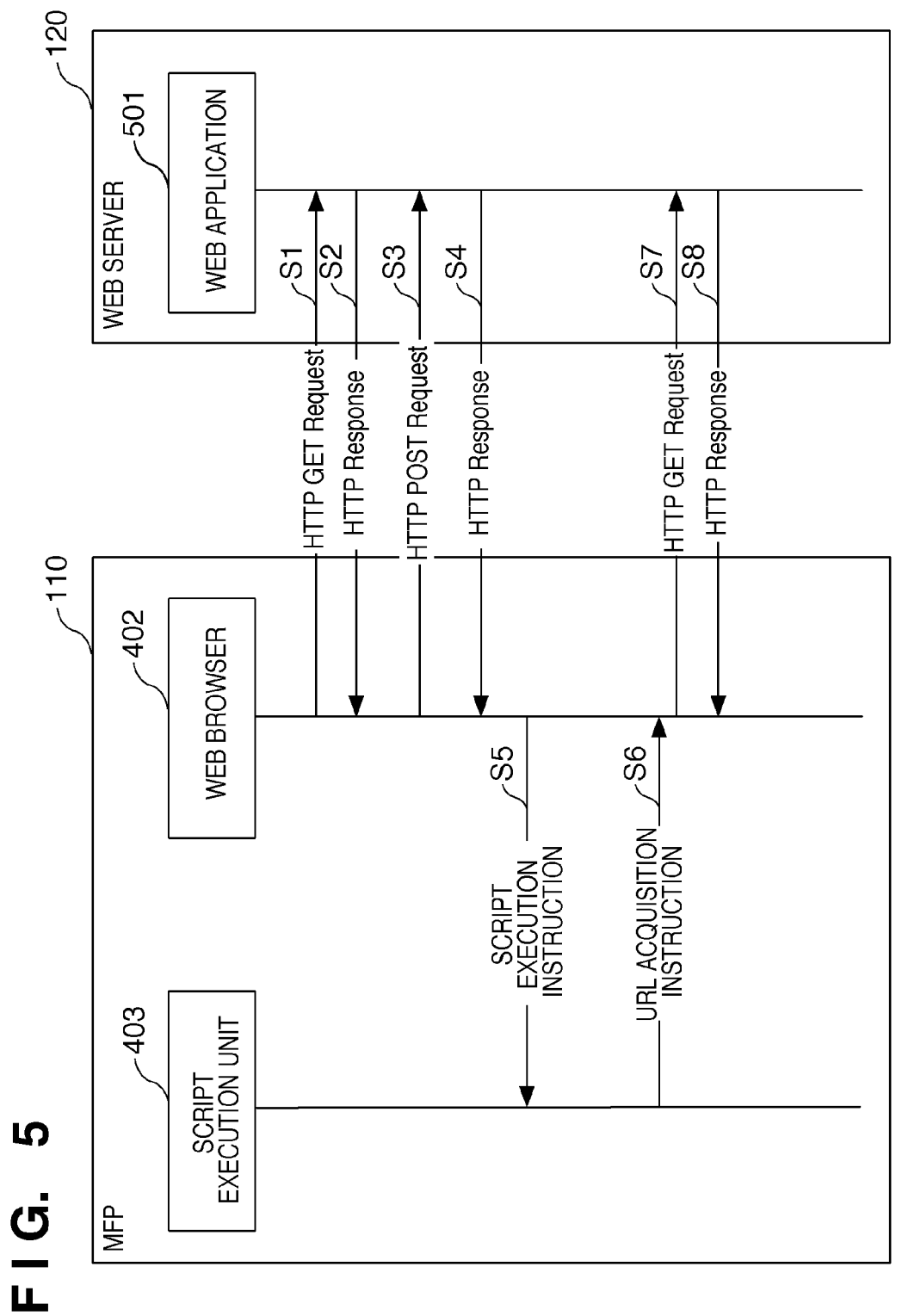
FIG. 5 is a schematic block diagram showing a processing procedure for the information processing system.

[Processing Procedure for Information Processing System (FIG. 5)]

In the following, a processing procedure for the information processing system will be described on the assumption that for example, image data is generated by reading each document on a document glass through the use of the scanner unit 112 of the MFP 110 and the generated image data is transmitted to a FTP server (not shown) on the LAN 100.

To begin with, the user presses a hardware button for transmission (not shown) on the operation unit 111 of the MFP 110 to start the Web browser 402. To call up a setting screen for processing execution, the Web browser 402 issues a request to the Web application 501 in the Web server 120. In this embodiment, it is assumed that a uniform resource locator (URL), through which the contents of the setting screen are indicated, is previously established at the MFP 110.

By using the Web browser 402, the CPU 201 issues a request using a HTTP GET command to the Web application 501 in which the contents indicated through the URL are held (step S1). Specifically, HTML data is passed from the Web browser 402 to the HTTP communication unit 401. Communications under the HTTP are carried out between the HTTP communication unit 401 and the HTTP communication unit 504 in the Web server 120 based on the HTML data. The HTML data received at the HTTP communication unit 504 is passed the appropriate Web application based on the received URL data. That is, a request from the Web browser 402 to the Web application 501 is made by executing such processing. In the following, processing executed at steps subsequent to step S1 will be described, where descriptions of processing executed by using the HTTP communication unit 401 in the MFP 110 and processing executed by using the HTTP communication unit 504 in the Web server 120 will be omitted.

Figure 6:
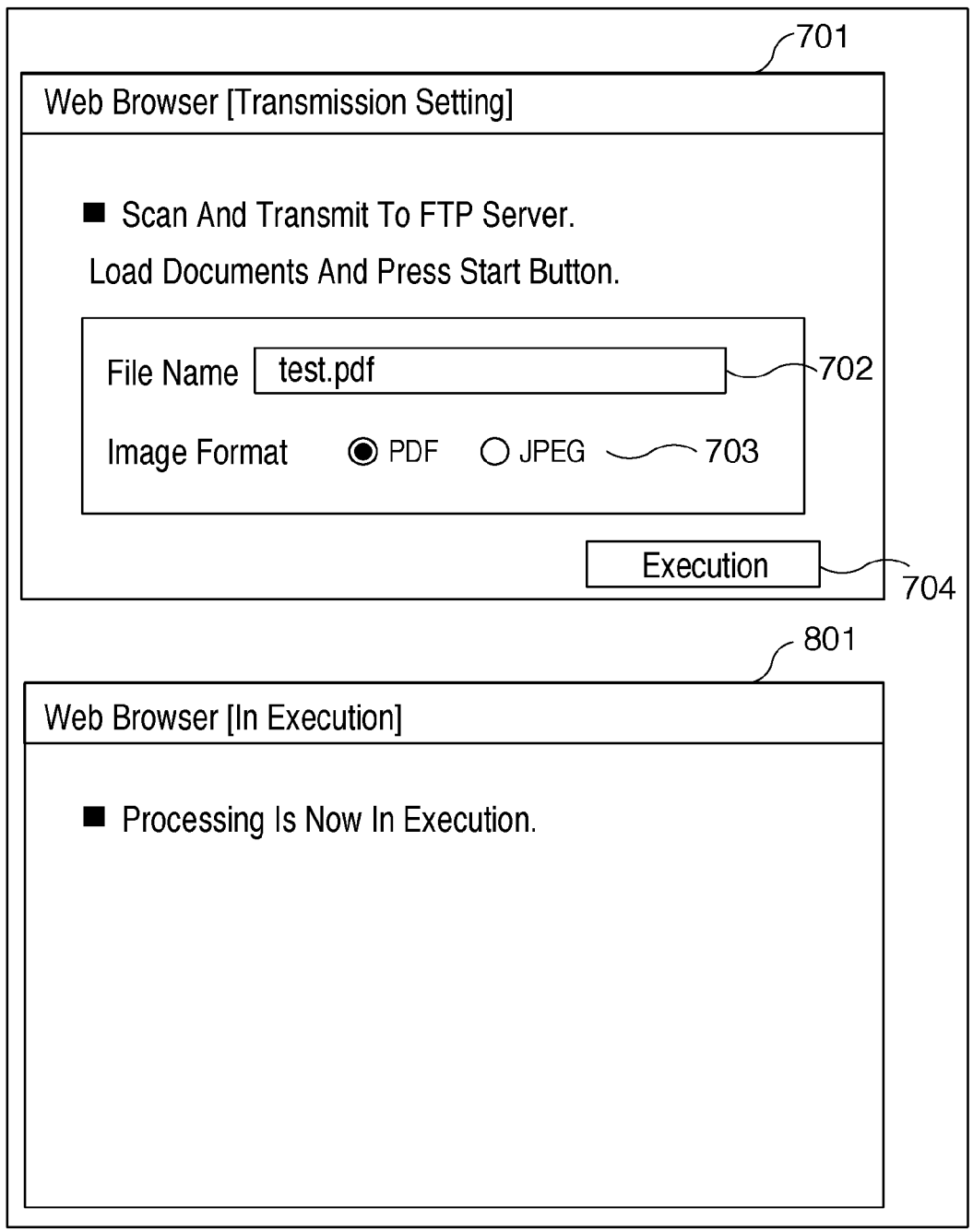
FIG. 6 is an illustration showing an example of a setting UI displayed with a Web browser.

In response to the request issued at step S1, HTML data describing a setting screen is generated and sent to the Web browser 402 as a HTTP response according to the presentation unit 502 of the Web application 501 (step S2). By using the Web browser 402, the received HTML data is analyzed and the setting screen is displayed at the operation unit 111. As an example of the setting screen, FIG. 6 shows a GUI panel 701. On the GUI panel 701, a text box control 702 for setting a file name and a radio button 703 for selecting an image format are provided. This example shows settings of giving a file name "test.pdf" to image data and generating the data in PDF. And further, a GUI button 704 is a button for issuing an instruction as to the execution of function; when the user has pressed the button, an instruction as to the start of scanning is issued.

Where an instruction as to the execution of the function has been issued through the pressing of the GUI button 704 by the user, a request to execute the function is sent to the Web application 501 according to the Web browser 402 (the first transmission means) (that is, first processing request data is transmitted) (step S3). For example, where the GUI button 704 of FIG. 6 has been pressed by the user, parameters set at the text box control 702 and the radio button 703 are notified to the Web application 501 according to the Web browser 402. In such communications, a HTTP POST command is used.

In response to the request issued at step S3, HTML data describing an in-execution screen is generated by using the presentation unit 502 of the Web application 501. Moreover, by using the logic unit 503, script data for processing execution by the MFP is generated based on setting data included in the POST command issued at step S3. At the time of the script creation, session ID (session identification data) for script identification is generated by using the logic unit 503. And further, assuming that after a request to the MFP for the script processing, communications have broken down, a session ID retention time (session ID timeout period) is set. In this embodiment, data describing the timeout period is not only retained in the Web application 501, but written into the script. That is, the script data serves as setting data in which the timeout period at the Web browser 402 is stipulated. Assuming overhead included at the time of the processing, however, data describing a time period being shorter than that at the Web application 501 may be written into the script. Thereafter, the in-execution screen data and the script data are sent to the Web browser 402 as a HTTP response (response data) (step S4). The Web browser 402 splits the HTTP response data into the HTML in-execution screen data and the script data, following which the in-execution screen is displayed with the operation unit 111. As an example of the in-execution screen, FIG. 6 shows a GUI panel 801. On the GUI panel 801, a display for notifying the user that processing is now in execution.

FIG. 7 shows an example of the script data for the processing execution generated by using the logic unit 503 sent to the Web browser 402. Although the script data according to the invention has been represented in extensible markup language (XML), any format can be used on the precondition that the MFP 110 can process data represented in that.

The "EventHandler" tag 901 is a part where processing performed on events during the script execution is described. "Event Type" refers to an attribute representing kinds of events, and "AllError" refers to all error events occurring during the script execution.

The "Notify" tag refers to processing at the time of event occurrence. The "URL" tag as a subelement of the "Notify" tag refers to a URL indicating a destination. And further, the "NotifyItem" tag, which is also a subelement of the "Notify" tag, represents a query character string at the latter part of the URL. "Key" and "Value" included in the attribute refer to "Key" and "Value" in the query character string, respectively; in this example, the query character string represents session ID for identifying a script through the use of the Web application 501. That is, in this example, "0123" refers to session ID generated at the logic unit 503. Likewise, the "NotifyScriptInfo" tag as a subelement of the "Notify" tag represents providing parameters necessary for script execution as the query character string of the URL. Incidentally, "value" of the "jobType" value refers to the value of the attribute, "SorceJobType" refers to the kind of job, and "value" of the "errorEvent" value refers to the value of the attribute, and "EventName" refers to an event name given to an event having occurred and dynamically generates the value at the time of event occurrence.

More specifically, the tag 901 means that when a scanner jam has occurred during the scanning based on the job script, a URL "http://www.xxx.com/scripterror.htm?id=0123&jobType=Scan&errorEvent=ScannerJam" is created and communications are carried out based on the Web browser 402.

The "EventHandler" tag 902 represents access to a URL corresponding to an event "Start of Transmission" (SendStart). The "EventHandler" tag 903 represents access to a URL corresponding to an event "Processing Timeout" (TimeOut). As described above, in this example, the script has a structure where the broad classification of the events is determined based on the former parts (addresses) of the URLs (that is, the addresses) and details are determined based on the latter parts of the URLs (that is, the query character strings).

The "Scan" tag 904 represents setting information concerning scanning processing executed based on the script. In this example, the setting of "DocumentSize" is "AUTO" setting, and "ColorMode" is "GRAY_SCALE" mode.

The "Send" tag 905 represents setting information concerning transmission processing executed based on the script. This example shows a transmission to a server (server name: "ftpserver.xxx.com") under FTP. In addition, it is shown that "FileFormat" is PDF and "fileName" is "test".

Figure 8:
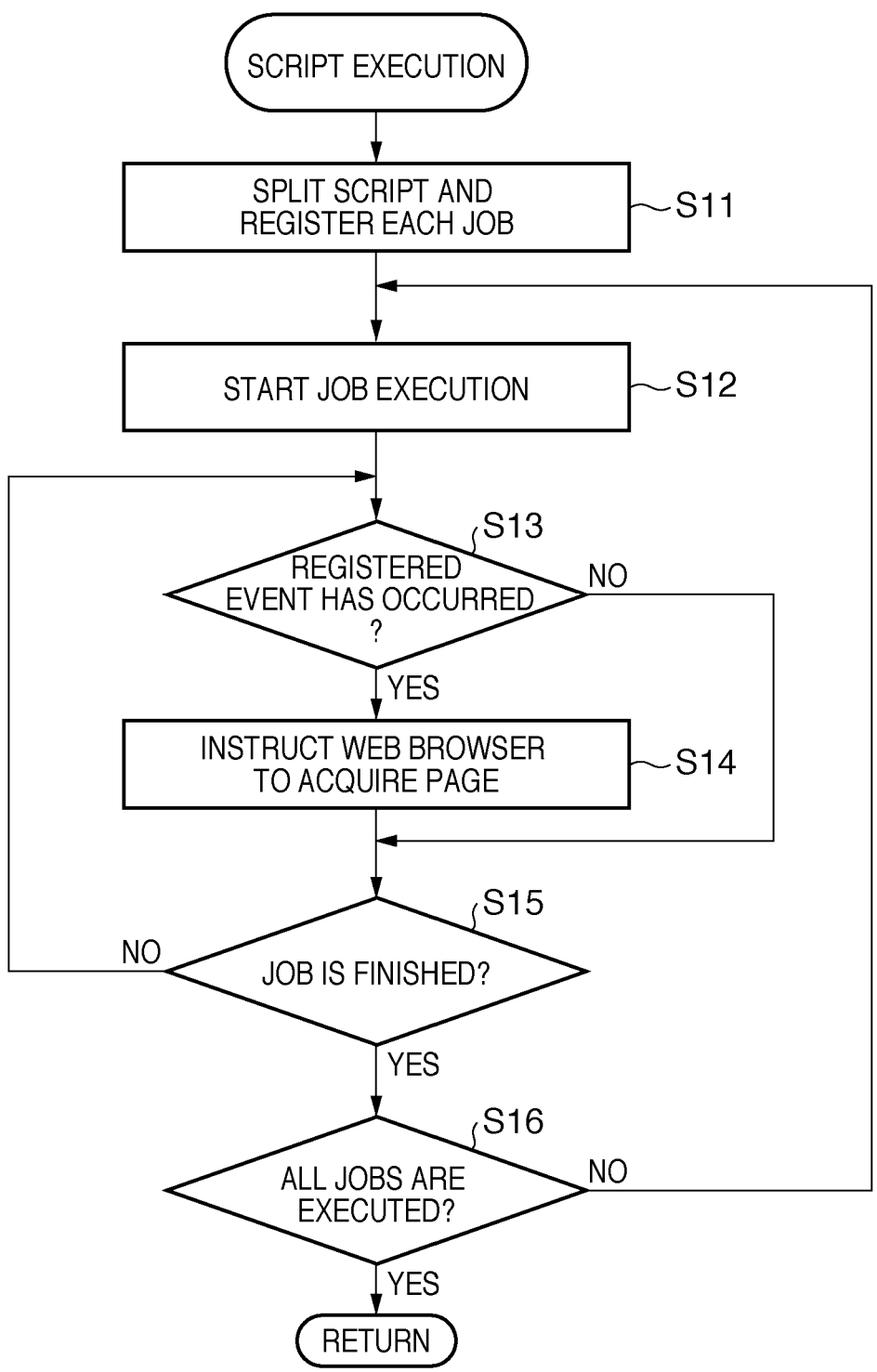
FIG. 8 is a flowchart of a detail processing procedure for a script execution unit.

The Web browser 402 passes the scrip data sent at step S4 to the script execution unit 403 (step S5). Upon receiving the script data, the script execution unit 403 executes a job according to processing contents of the script data. Incidentally, the procedure of the script execution will be described later with reference to FIG. 8.

Figure 9:
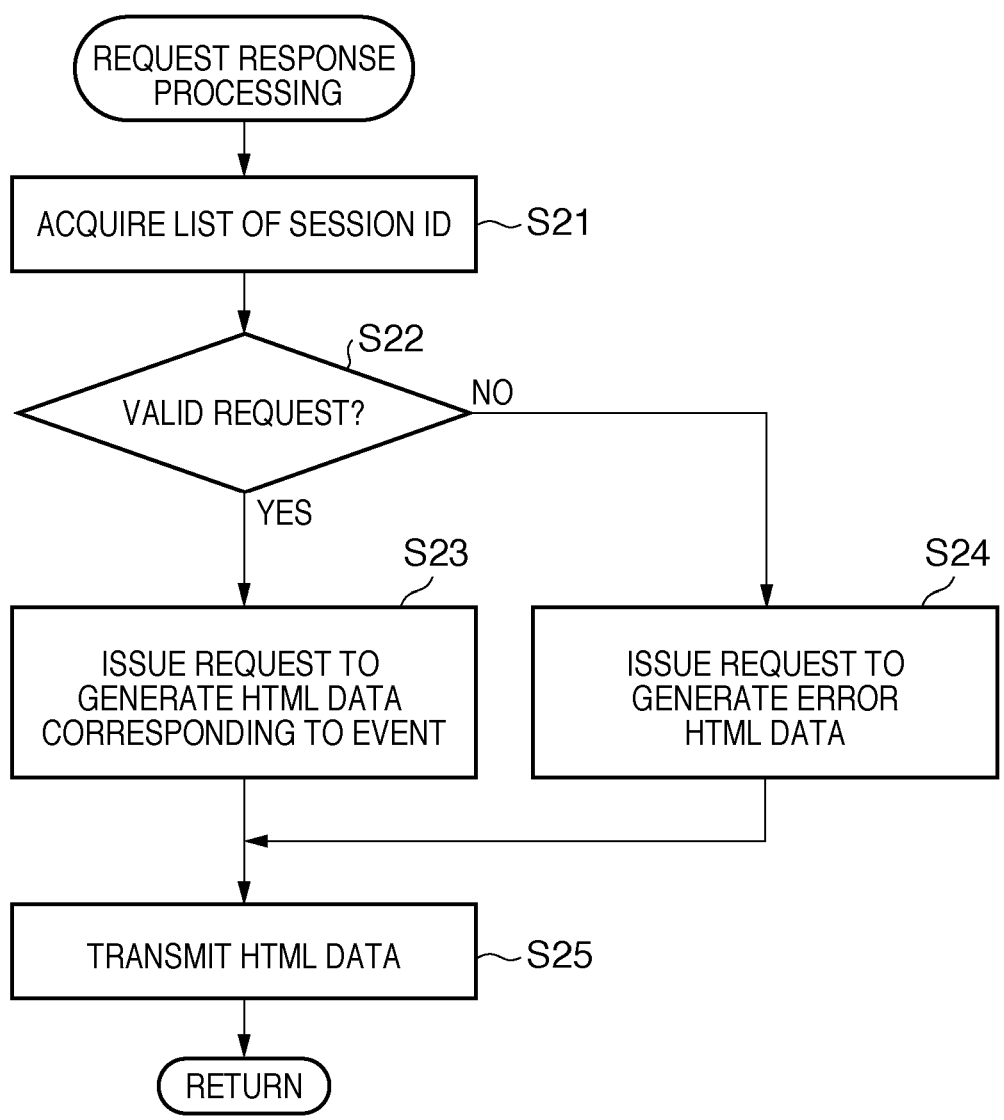
FIG. 9 is a flowchart of a detail procedure of request response processing at a Web application.

As the next step, the script execution unit 403 instructs the Web browser 402 to acquire contents provided through a URL corresponding to an event having occurred actually of the URLs (addresses) included in the script data (step S6). Then the Web browser 402 (the second transmission means) issues a request using a HTTP GET command to acquire contents provided through the URL indicated with the script execution unit 403 (that is, second processing request data is transmitted) (step S7). Since the URL used to issue the request is generated according to a script indicated from the Web application, the Web application can recognize what kind of event has occurred at the MFP from the URL indicating the accessed content. Moreover, the Web application can also recognize details of the events from the query character strings of the URLs. Incidentally, details of request response processing at step S7 will be described later with reference to FIG. 9.

Figure 10:
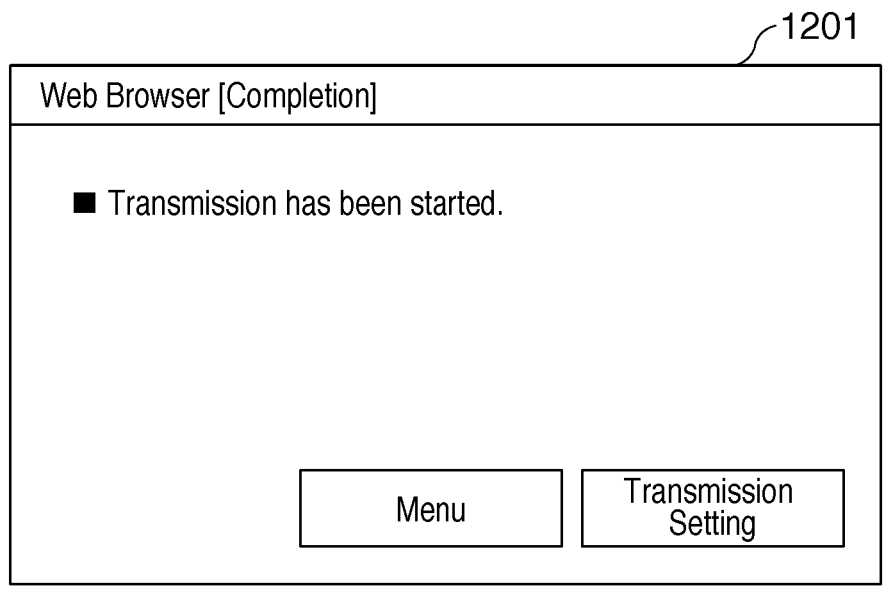
FIG. 10 is an illustration showing an example of a setting UI representing completion by the Web browser.

The Web server 120 passes HTML data describing the result of the processing to the Web application 501 (step S8). The Web browser 402 makes the operation unit 111 display the received HTML data. FIG. 10 shows an example of a setting UI representing the completion of the processing by the Web browser 402. On a GUI panel 1201 are provided a button used to return to the menu screen after the completion of the use of the Web application and a button used to call up a setting screen for executing transmission processing following rescanning.

(Detail Processing Procedure Set in Script Execution Unit 403 (FIG. 8))

Upon receiving the script data from the Web browser 402 at step S5, the script execution unit 403 starts the following processing. To begin with, the script execution unit 403 splits the script data into individual job data, and registers the job data in the job management unit 404 (step S11). In the example of FIG. 7, the data is split into two items of job data, that is, a scan job and a transmission job. And further, at this point in time, the script execution unit 403 starts a timer for measuring the timeout period described in the script. When a time period measured with the timer has become longer than the overtime period, a timeout event occurs.

Next, the job management unit 404 makes the job execution unit 405 start to execute the job (step S12). Then the script execution unit 403 monitors the statuses of the job execution unit 405 and the device, and determines whether or not the events described in the script have occurred (step S13). When the event described in the script has occurred, the script execution unit 403 creates a URL and requests the Web browser 402 to carry out communications based on the data in the script (step S14). When the data in the script includes a description of inputting job information and data describing kinds of jobs as query character strings at that time, a query character string is created to create a URL. In the example of FIG. 7, when a transmission job has been started, the URL "http://www.xxx.com/scriptSendStart.htm?id-0123" is created, and a request is issued to the Web browser 402. Likewise, when a scanner jam error has occurred, a URL "http://www.xxx.com/scripterror.htm?id=0123&jobType=Scan&errorEvent=ScannerJam" is created.

On the other hand, in the case where the determination that the events written in the script have not occurred has been made at step S13, processing at step S14 is omitted, and operation at step S15 is executed. Then the job management unit 404 monitors the job execution unit 405, and determines whether the job is finished or not (step S15). When the job is finished, the job management unit 404 determines whether or not all the jobs described in the script are finished (step S16). On the other hand, when the job is not finished, a return to step S13 is made.

When the determination that all the jobs are not finished has been made at step S16, a return to step S12 is made to execute the next job. On the other hand, when all the jobs are finished, the processing is finished.

(Detail Procedure of Request-Response Processing in Web Application 501 (FIG. 9))

Upon accepting the request from the Web browser 402 at the Web application 501 at step S7, the following processing is started. To begin with, the logic unit 503 of the Web application 501 obtains a list of presently held session ID (step S21). Then the logic unit 503 determines whether or not session ID included in a query character string of a URL accepted at the HTTP communication unit 504 is included in the list obtained at step S21 (step S22). When the session ID is included in the list, the determination that it is a valid request dealt with within a fixed time period based on a script created at the logic unit 503 is made, and a request to the presentation unit 502 to generate HTML data describing the result of the determination is made (step S23). When the request is not valid, the determination that the request is a request from a crooked client or a timeout invalid request is made, and the logic unit 503 makes a request to the presentation unit 502 to generate HTML data for notifying the error to the user (step S24). Finally, the presentation unit 502 transmits the generated HTML data via the HTTP communication unit 504 to the Web browser 402 (step S25).

As described above, according to this embodiment, since the MFP 110 executes processing by making a response at step S4 after the issue of a request for function execution at the Web browser 402 at step S3, no timeout occurs at the Web browser 402. And further, through the adoption of such a configuration, screen data generated at the Web application 501 can be displayed with the Web browser 402 based on the processing event at the MFP 110. Likewise, even when a session timeout is likely to occur, suitable screen data can be displayed because it is possible to issue a request at the Web browser 402 according to setting described in a script before the session timeout.

<Second Embodiment>

In the first embodiment, the MFP executes processing based on script data in addition to HTML data; in the second embodiment, a MFP is controlled using JavaScript data in HTML data; and besides, at the time of the occurrence of a processing execution event, a request is made to a Web server for a UI for a screen display corresponding to the event. That is, a hardware configuration according to this embodiment is the same as that according to the first embodiment, but different from that in the software configuration of and the processing procedure for the MFP 110 as follows.

Figure 11:
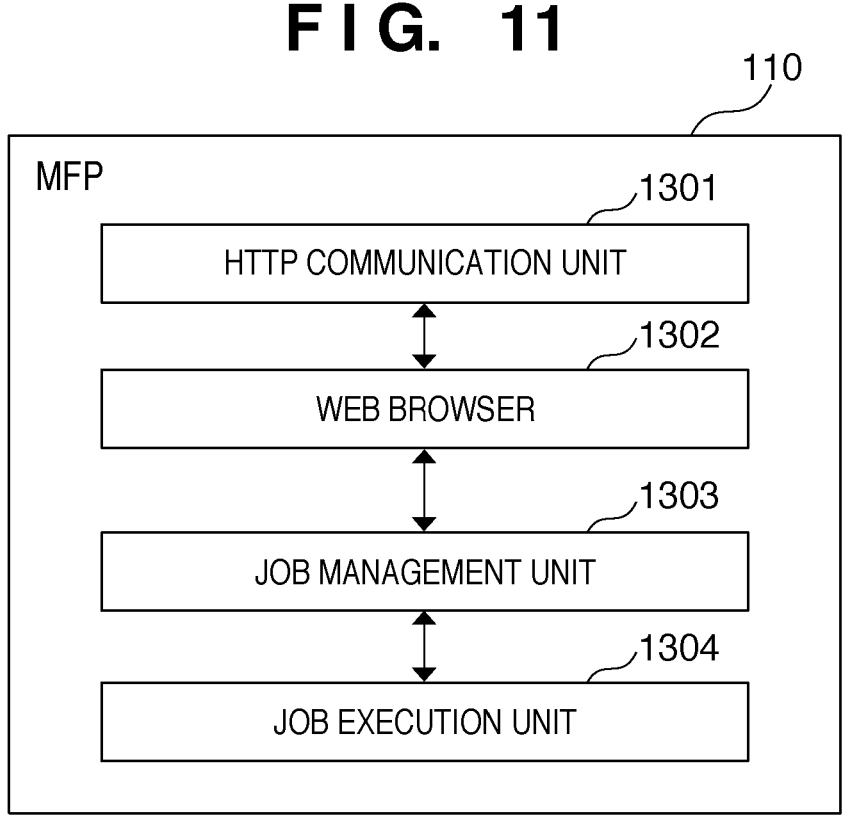
FIG. 11 is a block diagram showing a software configuration in a MFP according to a second embodiment.

[Software Configuration of MFP 110 (FIG. 11)]

Figure 3:
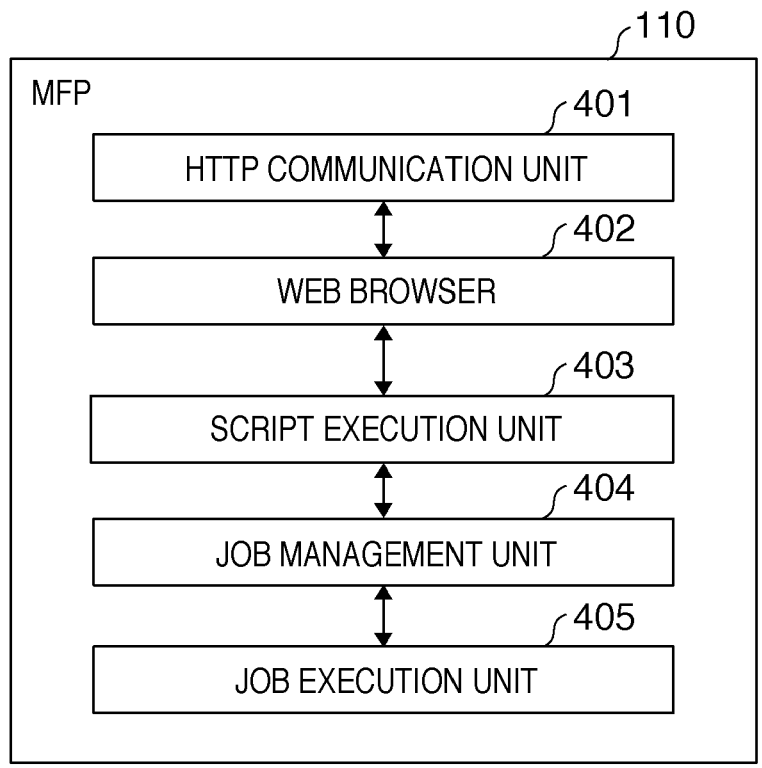
FIG. 3 is a block diagram showing a software configuration in the MFP.

The configuration of a HTTP communication unit 1301, a job management unit 1303, and a job execution unit 1304 is the same as that according to the first embodiment (see FIG. 3). A Web browser 1302 not only has the function of the Web browser 402 according to the first embodiment, but can execute a JavaScript program for invoking the job management unit 1303. Incidentally, a description of JavaScript will be made later. These software modules are stored in the HDD 204 of the MFP 110, and executed by the CPU 201.

[Processing Procedure for Information Processing System (FIG. 12)]

As in the case of the first embodiment (see FIG. 7), an example of scan transmission processing will be shown below; processing from the start of the Web browser 1302 to step S33 is the same as step S3 executed in the first embodiment, and thus a description of the processing will be omitted.

To begin with, the presentation unit 502 of the Web application 501 generates HTML data describing an in-execution screen in response to a request issued from the Web browser 1302 at step S33.

The logic unit 503 generates a JavaScript program for processing execution at the MFP 110 based on setting information included in the Post command issued at step S33. And further, the logic unit 503 generates session ID and sets a timeout period as in the case of the first embodiment, following which the logic unit 503 converts these data items to JavaScript codes. Then the logic unit 503 passes the generated JavaScript program to the presentation unit 502. Thereafter, the presentation unit 502 transmits HTML data combined with the JavaScript program to the Web browser 1302 as a HTTP response (step S34).

The Web browser 1302 makes the operation unit 111 display the in-execution screen according to the received HTTP response, and executes the JavaScript program in the HTML data. Only when the job has been executed normally at the job management unit 1303 according to the JavaScript program, processing from step S35 to step S39 is executed.

Finally, in response to a request issued at step S39, the Web application 501 transmits contents representing normal completion to the Web browser 1302 (step S40). This processing is the same as that described in the first embodiment (see FIG. 9).

FIG. 13 shows an example of the foregoing HTML data. Parts denoted by reference numerals 1501 to 1506 are JavaScript parts. The Web browser 1302 displays HTML data, and then executes the JavaScript program in order starting from 1501.

To begin with, the JavaScript part 1501 is a part for setting parameters for scanning processing. In this example, "colorMode" is set to "FullColor", "resolution" is set to 300 dpi, and "timeOut" is set to 20 min.

Next, the "CreateEventHandler" function in the JavaScript part 1502 generates an instance of a process handler for an event in job processing. This function refers to a JavaScript definition extended by the Web browser 1302 itself according to this embodiment. A first argument is used to represent an identifier for a handling event. A second argument is used to represent an identifier for processing executed in correspondence with the event. A third argument is used to represent job processing to be executed at the time of the occurrence of the event. A fourth argument is used optionally. When the code "HotifyURL" indicating making a notification from the Web browser 1302 to the Web application 501 has been specified as a fourth argument, an intended URL shall be specified. In this example, two event processing handlers are generated. One of the handlers indicates setting that upon "TimeOut", the job is canceled and contents indicated with a relative URL presented as "scripttimeout.htm?id=01234" are acquired. The other handler indicates setting that upon the occurrence of error ("AllError"), the job is canceled and contents indicated with a relative URL presented as "scriptError.htm?id=01234&jobType=% JOB_TYPE % &errorEvent=% EVENT_NAME %" are acquired. Note that the code "% JOB_TYPE %" of the URL shall be replaced with the kind of job at the time of the execution of the processing. Also, the code "% EVENT_NAME %" shall be replaced with an identifier for the event.

In the JavaScript part 1503, a "scan" function for scanning job execution is executed. This function is a JavaScript function extended by the Web browser 1302 itself according to the second embodiment. A first argument is used to specify reference to a document produced as a result of the scanning. A second argument is used to specify setting on the scanning execution. A third argument is used to specify an event processing handler.

In response to the call of the "scan" function, the Web browser 1302 according to the second embodiment passes parameters specified with the arguments to the job arrangement unit 1303 to create a scanning job. In response to the creation, the job management unit 1303 calls up the job execution unit 1304 to execute the scanning job. And further, the job management unit 1303 monitors the statuses of the device and the job during the job execution. When an event defined in the event processing handler has occurred during the monitoring, the event is processed. Therefore, in the case where the event processing handlers as the JavaScript part 1502 in FIG. 13 are registered, upon the occurrence of a timeout, an instruction to make a request for contents indicated through the specified URL is issued to the Web browser 1302. Such an instruction is also issued when some error has occurred.

When the scanning has been finished normally, the Web browser 1302 receives an identifier for image data stored in the HDD 204 from the job management unit 1303 as the value of the first argument, and also receives the result of the scanning processing from the job management unit 1303 as the return value of the function.

When the scanning has been done successfully, the JavaScript parts 1504 to 1506 are executed. The JavaScript part 1504 is a part used to set parameters for transmission processing. In this example, the parameters for FTP transmission and the file name and format of a file to be transferred are specified.

In the JavaScript part 1505, definitions of event processing handlers are given as in the case of the JavaScript part 1502. In this example, two handlers are defined. One of the handlers indicates setting that upon the occurrence of error ("AllError"), the job is canceled and a relative URL presented as "scriptError.htm?id=01234&jobType=% JOB_TYPE % &errorEvent=% EVENT_NAME % is acquired. As in the case of the JavaScript part 1502, the codes "% JOB_TYPE %" and "% EVENT_NAME %" of the URL shall be replaced. The other handler indicates setting that when a state in which transmission is started has been brought about ("SendStart"), the job processing is executed in a background manner and a relative URL presented as "scriptSendStart.htm?id=01234" is acquired.

The JavaScript part 1506 represents the execution of a "send" function for the execution of a transmission job. This function is also a JavaScript part extended by the Web browser 1302 itself according to the second embodiment. A first argument is used to represent document data to be transmitted. A second argument is used to represent setting for the execution of the transmission. A third argument is used to represent an event processing handler.

In response to the call of the "send" function, the Web browser 1302 according to the embodiment passes the parameters specified with arguments to the job arrangement unit 1303, and creates a transmission job. Processing subsequent to the job creation is the same as that described in the section where the reference to the "scan" function has been made. In this example, when the transmission job has been started normally according to the setting indicated as the JavaScript part 1505, the job management unit 1303 issues an instruction to acquire contents indicated through the URL specified with the Web browser 1302 while continuing the transmission execution.

The use of the above JavaScript program makes it possible to control the URL for issuing a request according to the kind of event by using HTML data from Web application.

As described above, in the second embodiment, since the MFP 110 executes processing according to the JavaScript program included in the response made at step S34 after having issued a request to execute the function at the Web browser 1302 at step S33, no timeout occurs at the Web browser 1302. Moreover, by the use of this configuration, it becomes possible to make the Web browser 1302 display screen data generated with the Web application 501 in accordance with the events processed by the MFP 110.

Note that although query character strings are added according to specification of a script and HTML data in the first and second embodiments, a software configuration may be used in which software in a MFP automatically generates query character strings including the statuses of jobs and job identifiers and a request is issued from a Web browser.

Moreover, although a script in which plural URLs are used in accordance with the kinds of events is received in the first and second embodiments, a software configuration may be used in which one URL is used to indicate all events and notification of kinds of events is provided by using query character strings.

Furthermore, although a request using a HTTP GET command is issued to a URL at the time of the occurrence of some event in the first and second embodiments, a software configuration may be used in which a request using a HTTP POST command may be issued. In this case, the statuses and identifiers of jobs are described at the body of the request using the POST command instead of query character strings.

<Other Embodiments>

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-280955, filed Dec. 10, 2009, and which is hereby incorporated by reference herein in its entirety.

The invention claimed is:

1. An information processing apparatus including a Web browser with which an operation screen provided from a Web server is displayed, the information processing apparatus comprising:

an interface configured to communicate with the Web server and to transmit a first request to the Web server according to an instruction input via the operation screen displayed by the Web browser; and a processor configured to (a) receive, via the interface, response data to the first request from the Web server, execute an image processing according to a script included in the received response data, and (b) transmit, via the interface, a second request to the Web server in accordance with an event which can occur during an execution of the image processing, wherein the response data from the Web server includes (a) one URL for a plurality of events which can occur during an execution of the image processing and (b) time information with which the Web browser executes timeout, and wherein the processor is configured to, in response to an occurrence of an event having occurred before the Web browser executes timeout and in response to a timeout event related to the time information, transmit the second request by using the one URL to which an ID for identifying the script is added as a query character string.

2. An information processing apparatus including a Web browser with which an operation screen provided from a Web server is displayed, the information processing apparatus comprising:

an interface configured to communicate with the Web server and to transmit a first request to the Web server according to an instruction input via the operation screen displayed by the Web browser; and a processor configured to (a) receive, via the interface, response data to the first request from the Web server, (b) execute an image processing according to a script included in the received response data, and (c) transmit, via the interface, a second request to the Web server in accordance with an event which can occur during an execution of the image processing, wherein the response data from the Web server includes (a) one URL for a plurality of events which can occur during an execution of the image processing and (b) time information with which the Web browser executes timeout, and wherein the processor is configured to, in response to an occurrence of an event having occurred before the Web browser executes timeout and in response to a timeout event related to the time information, transmit the second request by using the one URL to which information indicating a content, when the event occurs, of the image processing is added as a query character string.

3. The information processing apparatus according to claim 2, wherein the image processing executed by the execution unit is a reading processing to read an image on an original.

4. An information processing apparatus including a Web browser with which an operation screen provided from a Web server is displayed, the information processing apparatus comprising:

an interface configured to communicate with the Web server and to transmit a first request to the Web server according to an instruction input via the operation screen displayed by the Web browser; and a processor configured to (a) receive, via the interface, response data to the first request from the Web server, (b) execute an image processing according to a script included in the received response data, and (c) transmit, via the interface, a second request to the Web server in accordance with an event which can occur during an execution of the image processing, wherein the response data from the Web server includes (a) one URL for a plurality of events which can occur during an execution of the image processing and (b) time information with which the Web browser executes timeout, and wherein the processor is configured to, in response to an occurrence of an event having occurred before the Web browser executes timeout and in response to a timeout event related to the time information, transmit the second request by using the one URL to which a name of the occurred event is added as a query character string.

5. The information processing apparatus according to claim 4, wherein the occurred event is an error, and the name of the occurred event indicates that the occurred event is jam error.

6. A Web server that provides an operation screen to an information processing apparatus including a Web browser, the web server comprising:

an interface configured to communicate with the information processing apparatus and to receive a first request from the information processing apparatus according to an instruction input via an operation screen displayed by the Web browser; and a processor configured to (a) transmit, via the interface, response data to the first request to the information processing apparatus, the response data including a script for causing the information processing apparatus to execute an image processing, and (b) receive, via the interface, a second request from the information processing apparatus in accordance with an event which can occur during an execution of the image processing, wherein the response data includes (a) one URL for a plurality of events which can occur during an execution of the image processing and (b) time information with which the Web browser executes timeout, and wherein the processor is configured to receive the second request which is made in response to an occurrence of an event having occurred before the Web browser executes timeout and in response to a timeout event related to the time information and which is transmitted by using the one URL to which an ID for identifying the script is added as a query character string.

7. A Web server that provides an operation screen to an information processing apparatus including a Web browser, the web server comprising:

an interface configured to communicate with the information processing apparatus and to receive a first request from the information processing apparatus according to an instruction input via an operation screen displayed by the Web browser; and a processor configured to (a) transmit, via the interface, response data to the first request to the information processing apparatus, the response data including a script for causing the information processing apparatus to execute an image processing, and (b) receive, via the interface, a second request from the information processing apparatus in accordance with an event which can occur during an execution of the image processing, wherein the response data includes (a) one URL for a plurality of events which can occur during an execution of the image processing and (b) time information with which the Web browser executes timeout, and wherein the processor is configured to receive the second request which is made in response to an occurrence of an event having occurred before the Web browser executes timeout and in response to a timeout event related to the time information and which is transmitted by using the one URL to which information indicating a content, when the event occurs, of the image processing is added as a query character string.

8. The Web server according to claim 7, wherein the image processing executed by the information processing apparatus is a reading processing to read an image on an original.

9. A Web server that provides an operation screen to an information processing apparatus including a Web browser, the web server comprising:
an interface configured to communicate with the information processing apparatus and to receive a first request from the information processing apparatus according to an instruction input via an operation screen displayed by the Web browser; and
processor configured to (a) transmit, via the interface, response data to the first request to the information processing apparatus, the response data including a script for causing the information processing apparatus to execute an image processing, and (b) receive, via the interface, a second request from the information processing apparatus in accordance with an event which can occur during an execution of the image processing,
wherein the response data includes (a) one URL for a plurality of events which can occur during an execution of the image processing and (b) time information with which the Web browser executes timeout, and
wherein the processor is configured to receive the second request which is made in response to an occurrence of an event having occurred before the Web browser executes timeout and in response to a timeout event related to the time information and which is transmitted by using the one URL to which a name of the occurred event is added as a query character string.

10. The Web server according to claim 9, wherein the occurred event is an error, and the name of the occurred event indicates that the occurred event is jam error.

11. A method for controlling an information processing apparatus including a Web browser with which an operation screen provided from a Web server is displayed, the method comprising:
communicating with the Web server using an interface and transmitting a first request to the Web server according to an instruction input via the operation screen displayed by the Web browser;
receiving, in a processor and via the interface, response data to the first request from the Web server, and executing an image processing according to a script included in the received response data; and
transmitting, in the processor and via the interface, a second request to the Web server in accordance with an event which can occur during an execution of the image processing,
wherein the response data from the Web server includes (a) one URL for a plurality of events which can occur during an execution of the image processing and (b) time information with which the Web browser executes timeout, and
wherein the second request is transmitted, in response to an occurrence of an event having occurred before the Web browser executes timeout and in response to a timeout event related to the time information, by using the one URL to which an ID for identifying the script is added as a query character string.

12. A non-transitory computer-readable storage medium storing a program for causing a computer to execute a method for controlling the information processing apparatus described in claim 11.

13. A method for controlling an information processing apparatus including a Web browser with which an operation screen provided from a Web server is displayed, the method comprising:
communicating with the Web server using an interface and transmitting a first request to the Web server according to an instruction input via the operation screen displayed by the Web browser;
receiving, in a processor and via the interface, response data to the first request from the Web server, and executing an image processing according to a script included in the received response data; and
transmitting, in the processor and via the interface, a second request to the Web server in accordance with an event which can occur during an execution of the image processing,
wherein the response data from the Web server includes (a) one URL for a plurality of events which can occur during an execution of the image processing and (b) time information with which the Web browser executes timeout, and
wherein the second request is transmitted, in response to an occurrence of an event having occurred before the Web browser executes timeout and in response to a timeout event related to the time information, by using the one URL to which information indicating a content, when the event occurs, of the image processing is added as a query character string.

14. A non-transitory computer-readable storage medium storing a program for causing a computer to execute a method for controlling the information processing apparatus described in claim 13.

15. A method for controlling an information processing apparatus including a Web browser with which an operation screen provided from a Web server is displayed, the method comprising:
communicating with the Web server using an interface and transmitting a first request to the Web server according to an instruction input via the operation screen displayed by the Web browser;
receiving, in a processor and via the interface, response data to the first request from the Web server, and executing an image processing according to a script included in the received response data; and
transmitting, in the processor and via the interface, a second request to the Web server in accordance with an event which can occur during an execution of the image processing,
wherein the response data from the Web server includes (a) one URL for a plurality of events which can occur during an execution of the image processing and (b) time information with which the Web browser executes timeout, and
wherein the second request is transmitted, in response to an occurrence of an event having occurred before the Web browser executes timeout and in response to a timeout event related to the time information, by using the one URL to which a name of the occurred event is added as a query character string.

16. A non-transitory computer-readable storage medium storing a program for causing a computer to execute a method for controlling the information processing apparatus described in claim 15.

17. A method for controlling a Web server that provides an operation screen to an information processing apparatus including a Web browser, the method comprising:
communicating with the information processing apparatus using an interface and receiving a first request from the information processing apparatus according to an instruction input via the operation screen displayed by the Web browser;

transmitting, in a processor and via the interface, response data to the first request to the information processing apparatus, the response data including a script for causing the information processing apparatus to execute an image processing; and receiving, in the processor and via the interface, a second request from the information processing apparatus in accordance with an event which can occur during an execution of the image processing, wherein the response data includes (a) one URL for a plurality of events which can occur during an execution of the image processing and (b) time information with which the Web browser executes timeout, and wherein the second request is (a) received in response to an occurrence of an event having occurred before the Web browser executes timeout and in response to a timeout event related to the time information and (b) transmitted by using the one URL to which an ID for identifying the script is added as a query character string.

18. A method for controlling a Web server that provides an operation screen to an information processing apparatus including a Web browser, the method comprising:

communicating with the information processing apparatus using an interface and receiving a first request from the information processing apparatus according to an instruction input via the operation screen displayed by the Web browser;

transmitting, in a processor and via the interface, response data to the first request to the information processing apparatus, the response data including a script for causing the information processing apparatus to execute an image processing; and receiving, in a processor and via the interface, a second request from the information processing apparatus in accordance with an event which can occur during an execution of the image processing, wherein the response data includes (a) one URL for a plurality of events which can occur during an execution of the image processing and (b) time information with which the Web browser executes timeout, and wherein the second request is (a) received in response to an occurrence of an event having occurred before the Web browser executes timeout and in response to a timeout event related to the time information and (b) transmitted by using the one URL to which information indicating a content, when the event occurs, of the image processing is added as a query character string.

19. A method for controlling a Web server that provides an operation screen to an information processing apparatus including a Web browser, the method comprising:

communicating with the information processing apparatus using an interface and receiving a first request from the information processing apparatus according to an instruction input via the operation screen displayed by the Web browser;

transmitting, in a processor and via the interface, response data to the first request to the information processing apparatus, the response data including a script for causing the information processing apparatus to execute an image processing; and receiving, in the processor and via the interface, a second request from the information processing apparatus in accordance with an event which can occur during an execution of the image processing, wherein the response data includes (a) one URL for a plurality of events which can occur during an execution of the image processing and (b) time information with which the Web browser executes timeout, and wherein the second request is (a) received in response to an occurrence of an event having occurred before the Web browser executes timeout and in response to a time out event related to the time information and (b) transmitted by using the one URL to which a name of the occurred event is added as a query character string.

* * * * *